(No Model.) 5 Sheets—Sheet 1.

H. BOGARDUS.
TOILET CABINET OR OTHER WOODEN STRUCTURE.

No. 391,013. Patented Oct. 16, 1888.

(No Model.) 5 Sheets—Sheet 2.

H. BOGARDUS.
TOILET CABINET OR OTHER WOODEN STRUCTURE.

No. 391,013. Patented Oct. 16, 1888.

WITNESSES:

INVENTOR:
Hudson Bogardus,
By his Attorneys,
Arthur E. Fraser & Co.

(No Model.) 5 Sheets—Sheet 3.

H. BOGARDUS.
TOILET CABINET OR OTHER WOODEN STRUCTURE.

No. 391,013. Patented Oct. 16, 1888.

WITNESSES:
A. L. Schultz
Wm. H. Hannam

INVENTOR:
Hudson Bogardus,
By his Attorneys,
Arthur E. Graser & Co.

(No Model.) 5 Sheets—Sheet 4.

H. BOGARDUS.
TOILET CABINET OR OTHER WOODEN STRUCTURE.

No. 391,013. Patented Oct. 16, 1888.

WITNESSES:

INVENTOR:
Hudson Bogardus,
By his Attorneys,
Arthur G. Fraser & Co.

(No Model.) 5 Sheets—Sheet 5.

H. BOGARDUS.
TOILET CABINET OR OTHER WOODEN STRUCTURE.

No. 391,013. Patented Oct. 16, 1888.

WITNESSES:
A. L. Schultz
Wm. H. Hanmann

INVENTOR:
Hudson Bogardus,
By his Attorneys,
Arthur E. Brasier & Co.

UNITED STATES PATENT OFFICE.

HUDSON BOGARDUS, OF NEWARK, NEW JERSEY.

TOILET-CABINET OR OTHER WOODEN STRUCTURE.

SPECIFICATION forming part of Letters Patent No. 391,013, dated October 16, 1888.

Application filed January 10, 1888. Serial No. 260,353. (No model.)

*To all whom it may concern:*

Be it known that I, HUDSON BOGARDUS, a citizen of the United States, residing in Newark, in the county of Essex and State of New Jersey, have invented certain new and useful Improvements in Toilet-Cabinets or other Wooden Structures, of which the following is a specification.

My invention relates, generally, to structures which are built up of thin boards or plates of wood or other analogous material by interlocking the component parts or pieces with one another in such manner that they mutually hold one another in position and impart the requisite stiffness and strength to the structure. A structure of this character and embodying the same principle or method of interlocking the elemental pieces or sections that is employed in part with my present invention is illustrated in my patent, No. 249,823, dated November 22, 1881.

My present invention relates more specifically to hanging receptacles or cabinets for toilet and other uses—such, for example, as toilet-cabinets, brush-holders, towel-racks, mirrors, and the like, or a combination of two or more such articles. In its generic features, however, my invention is by no means limited to the particular kind or character of article or structure with which it is employed.

Figures 1 to 16 of the accompanying drawings represent a structure which I shall term a "toilet cabinet," and which embodies my invention in its preferred form. The remaining figures illustrate modifications.

I will first describe the construction shown in Figs. 1 to 16.

The structure here shown is a toilet-cabinet intended to be fastened upon the wall, and consisting, in general, of a back board or plate which occupies a vertical plane parallel with and closely adjacent to the wall, a box-like case or receptacle projecting to the front from said back, open trays or shelves projecting to opposite sides of said case, and a front door for closing said case which is pivoted at its top and swings upwardly.

The back board (lettered A) is built up of several sections or pieces which are united rigidly together by being interlocked with sections arranged in planes perpendicular thereto, and which are further stiffened by means of rigid rods, which are also interlocked with them.

The box or case (lettered B) has its back formed by a portion of the back board, A, and has its sides formed by two vertical sections arranged in parallel planes perpendicular to the back board, and its top and bottom formed of sections arranged in horizontal planes, also perpendicular to the back board. Its front is closed by the door, (lettered C.)

The bottom portion of the back board is extended laterally to a sufficient width, and to near its opposite sides are pivoted swinging arms D D, designed to be used as towel-racks.

The general features of this toilet-cabinet thus far alluded to are not of themselves essential to my invention, which relates rather to the means of uniting the several parts or sections than to the general plan of the structure. My invention introduces some new principles of construction applicable to the class of "interlocked wooden structures," by which term I mean to include not only structures made of wood, but also those made of other analogous materials or of materials which are capable of being united by interlocking in similar manner. The material which is preferable for use in such interlocked wooden structures is what is known as "two-ply" or "three-ply" veneer, the layers of which are glued together with their grain crossed to avoid warping or splitting.

I will now proceed to describe the exact specific construction shown in Figs. 1 to 16, remarking, however, that my invention is not to be understood as being limited to the details of construction which are so described.

Figure 4:
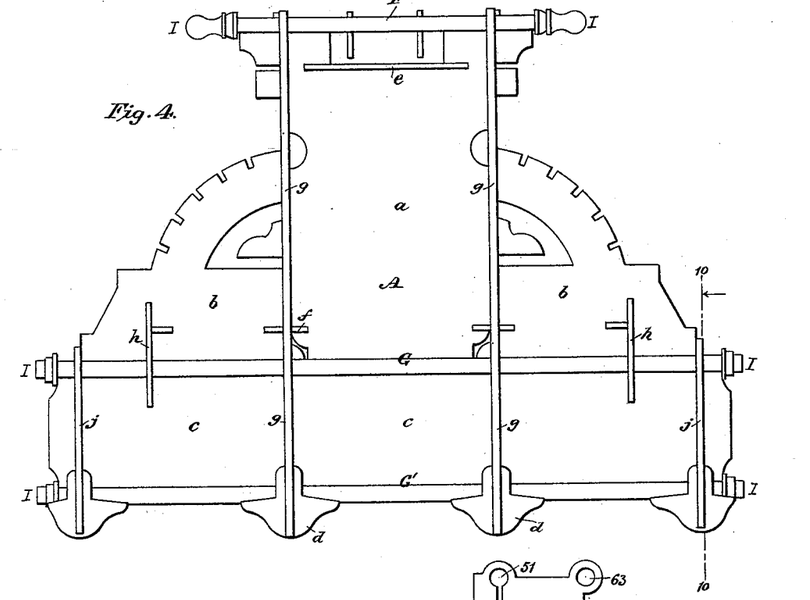
Fig. 4 is a rear elevation thereof.
Figure 5:
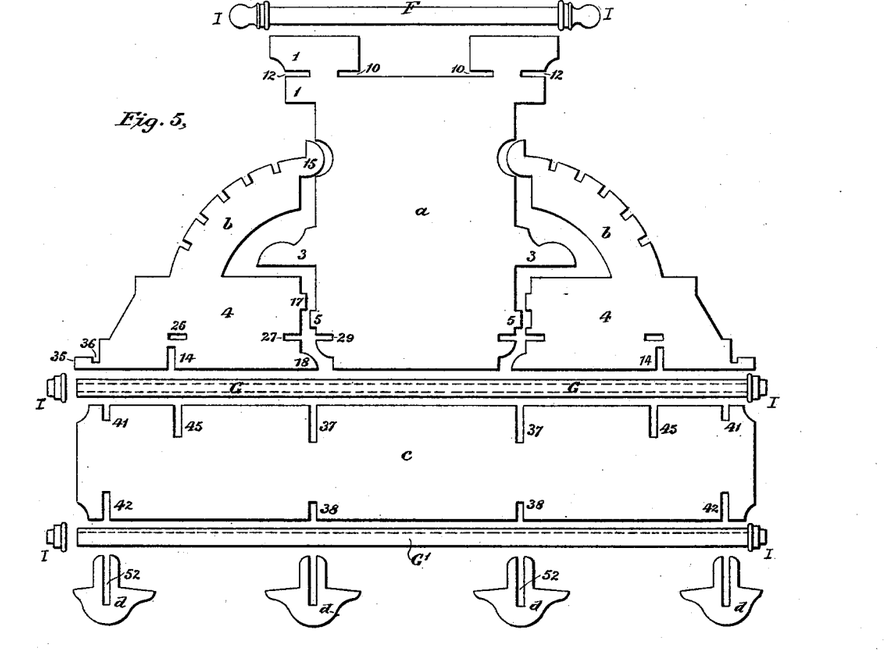
Fig. 5 is a front elevation of the several pieces constituting the back thereof.
Figure 6:
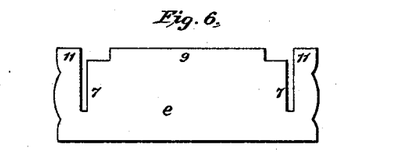
Figs. 6 and 7 are plan views of a top and bottom piece, respectively.

The back board, A, is best shown in Figs. 4 and 5. The latter figure shows the pieces or sections of which it is composed. These consist of a middle piece, a, which constitutes the back of the box B, two ornamental side pieces or wings, b b, on opposite sides thereof, and a lower section or panel, c, extending beneath the three upper pieces. There are also four small ornamental pieces, d d d d; but these have no other function than that of ornament and occupy a plane slightly in the rear of that of the pieces a, b, and c.

Figure 1:
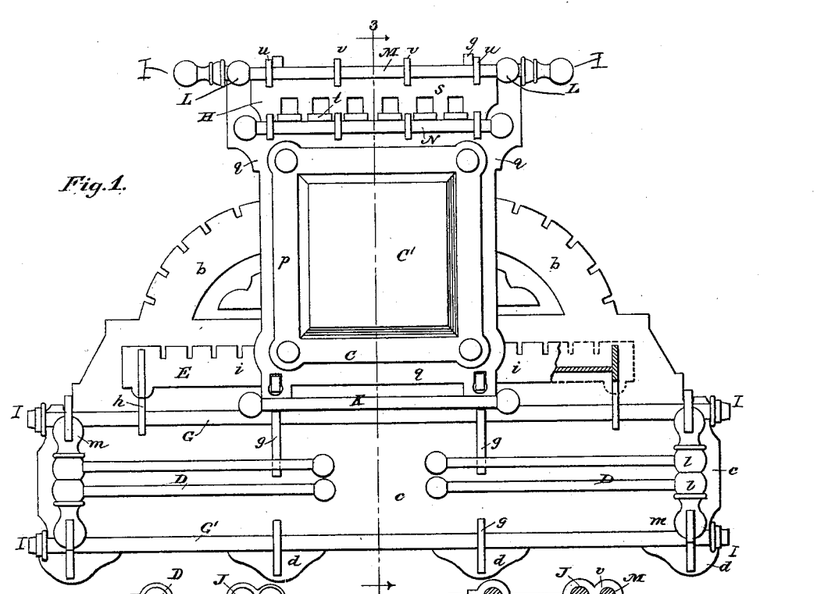
Fig. 1 is a front elevation of my toilet-cabinet.
Figures 2, 3:
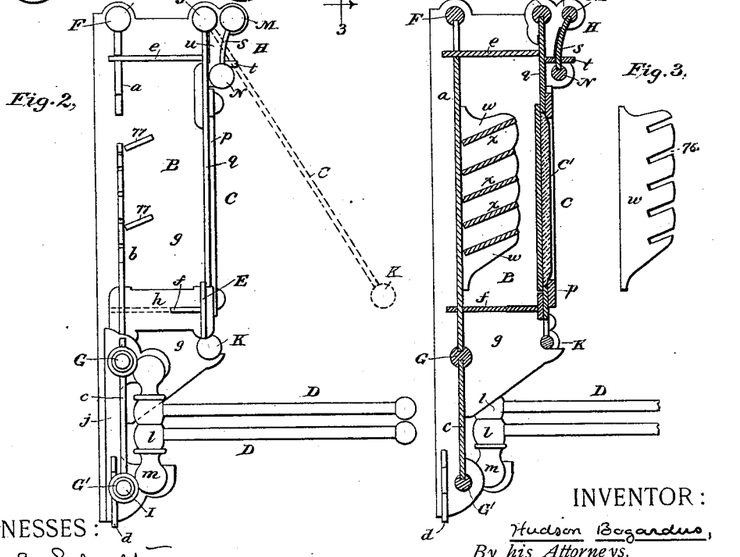
Fig. 2 is a side elevation thereof.
Fig. 3 is a vertical mid-section thereof cut on the line 3 3 in Fig. 1.

The sections occupying horizontal planes are the top piece, e, (shown in Fig. 6,) and the bottom piece, f, (shown in Fig. 7,) which constitute, respectively, the top and bottom of the box B, as will be seen on reference to Fig. 3. The bottom piece, f, is extended to each side beyond the sides of the box B in order to form shelves or open boxes E E, as best shown at the right in Fig. 1, where the structure is partially broken away to show the position of this shelf.

Figure 9:
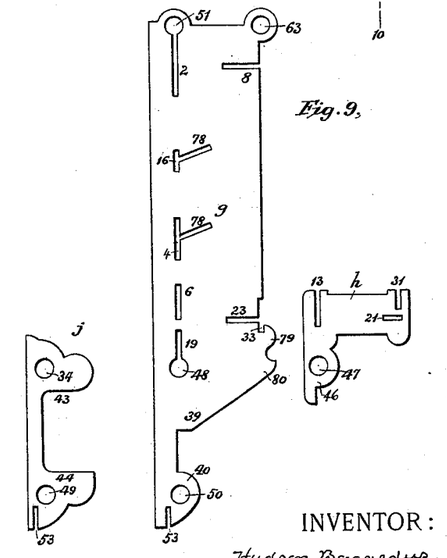
Fig. 9 is a side elevation of the several sections or pieces which stand in vertical planes perpendicular to the back-pieces.

There are two vertical sections, g g, both alike, one of which is shown in Fig. 9. These sections form the sides of the box B and extend from top to bottom of the structure. There are also two vertical sections, h h, which constitute brackets for supporting the opposite ends of the bottom piece, f, where the latter extend beyond the sides of the box to form the shelves E E.

Figure 8:
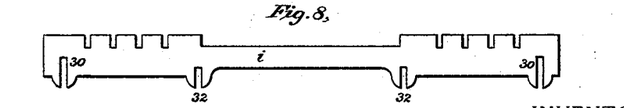
Fig. 8 is a front elevation of one of the sections.
Figure 10:
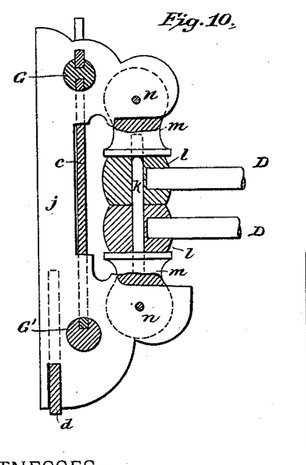
Fig. 10 is a side elevation on a larger scale, partly in section, on the line 10 10 in Fig. 4.

Fig. 8 shows a front section or strip, i, which occupies a vertical plane parallel with and in front of the plane of the back board, and extends along the front of the bottom piece, f, from end to end thereof, thereby constituting a ledge or front for the shelves E E. It is interlocked with the four vertical sections h, g, g, and h. There are two other vertical sections occupying planes perpendicular to the back board, which are lettered j j, and one of which is shown in Fig. 9. These sections are applied at the opposite ends of the panel-section c, and constitute the supports for the arms of the towel-racks D D, as best shown in Fig. 10. These towel-racks are constructed each with a vertical rod or pintle, k, on which the bosses or hubs l l of the arms D D are pivoted, and with turned knobs m m, fastened on the upper and lower ends of the pintle and formed with notches to receive the projecting arms of the section j. The parts D, l, k, and m m, being put together, are applied to the section j by slipping the knobs m m rearward, so that their notches shall engage the forward projections on the section j, and are then fastened by driving nails or screws n n transversely through them.

The back board, A, is stiffened by three round rods, F, G, and G', which extend horizontally, are held in place by passing through round holes in the perpendicular sections, and are engaged with the sections of the back board by being formed with grooves into which the edges of these sections enter. The upper and lower rods, F and G', are grooved only on one side, while the intermediate rod, G, is grooved both above and below, as clearly shown in Fig. 3. The ends of the rods are finished by having knobs I I slipped over them and glued or otherwise fastened to them.

Figure 11:
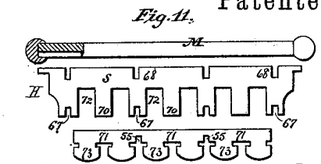
Fig. 11 is a view of the several pieces constituting the cornice separated.
Figure 12:
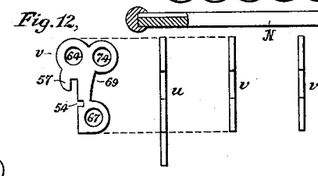
Figs. 12 and 13 are side elevations of the vertical brackets of the cornice.
Figure 13:
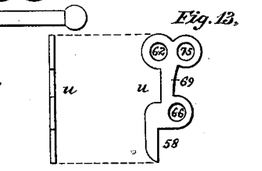
Figure 14:
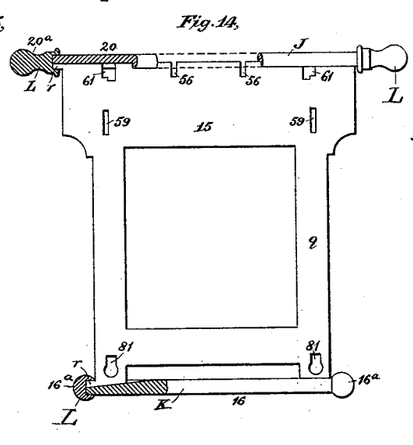
Fig. 14 is a front view of the swinging door of the cabinet, partly cut away to show its construction and with the cornice removed.
Figure 15:
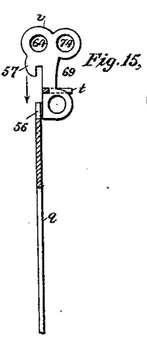
Figs. 15 and 16 are vertical transverse sections through the upper part of this door, showing the manner of applying the cornice-brackets.

The front door, C, is pivoted at its upper side, so that it swings outwardly and upwardly, as indicated by dotted lines in Fig. 2. As shown, it is ornamented by means of a mirror, C', fastened against its front by a frame, p, with projecting knobs at its corners. The upper portion of this door is provided with an ornamental cornice, H, the separate parts of which are shown in Figs. 11, 12, and 13. Fig. 14 shows the door with the cornice removed. It consists of a simple board or section, q, which may be cut out in its center for the attachment of the mirror, and which has a round rod, J, applied to its upper edge, and another rod, K, applied to its lower edge. These rods are grooved on the side toward the piece q, and the latter enters the groove and is formed with a wing, r, of a width equal to the depth of the groove, which projects laterally, or in a direction parallel with the rod, to or nearly to the end of the rod. A knob, L, is then slipped over the end of the rod, thereby confining the wing r, and is fastened by glue or in other suitable manner. This construction confines the rods J and K to the board or piece q. The rods may be grooved from end to end, as in the case of the rod J, or if the board q enters the rod only at the ends thereof or at other intervals the rod may be grooved only where the board q thus enters it, as in the case of the rod K.

The cornice H consists of two horizontal rods, M and N, a curved piece, s, occupying an approximately vertical position between them, a horizontal piece or section, t, interlocked with the piece s, and four brackets occupying vertical planes, of which the two end ones are lettered u u and shown in side view in Fig. 13, and the two middle ones are lettered v v and shown in side view in Fig. 12.

The parts constituting the structure are put together in the following order:

First. The section a of the back board is placed between the two perpendicular sections or side pieces, g g. In so doing the projections 1 1 on the former enter the slots 2 in the latter, the projections 3 enter the slots 4, and the projections 5 enter the slots 6. (See Figs. 5 and 9.)

Second. The top piece, *e*, is then applied by slipping it horizontally from the front backward, so that its notches 7 7, Fig. 6, embrace the side pieces, *g g*, and the notches 8 in the latter, Fig. 9, embrace the top piece, *e*, at its front, while the projection 9 at the back of the top piece enters the notches 10 10 in the back piece, *a*, Fig. 5, and the projections 11 11, Fig. 6, enter the notches 12 12, Fig. 5.

Third. One of the perpendicular brackets *h* is then united with one of the wing-pieces *b* of the back board by moving the bracket vertically upward from beneath the wing piece, with the notch 13 in the former, Fig. 9, engaging the notch 14 in the latter, Fig. 5. The wing-piece *b* is then applied laterally to the middle section, *a*, its projection 15 entering the slot 16 in the side piece, *g*, Fig. 9, its projection 17 entering the slot 6, and its projection 18 entering the slot 19, Fig. 9. The other side piece, *b*, and bracket *h* are first joined together and then applied on the other side of the section *a* in like manner.

Figure 7:
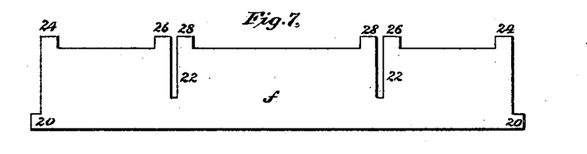

Fourth. The bottom piece, *f*, Fig. 7, is then applied by moving it horizontally backward from the front, its ends entering between the two brackets *h h*, which are sprung slightly outward to admit the ears 20 20, Fig. 7, which, when the bottom piece is in place, enter the slots 21, Fig. 9, in the brackets *h h*. In applying the bottom piece its notches 22 22 engage the notches 23, Fig. 9, in the vertical side pieces *g g*. When the bottom piece is in place, projections 24 24 at its rear side enter slots 25 in the wing-sections *b*, Fig. 5, projections 26 26, Fig. 7, enter notches 27 in the wing-pieces *b*, and projections 28 28 on the bottom piece, *f*, enter notches 29 29 in the middle section, *a*, Fig. 5.

Fifth. The front strip, *i*, Fig. 8, may then be applied, which is done by moving it vertically downward over the front edge of the bottom piece, *f*, (see Figs. 1, 2, and 3,) whereupon notches 30 30 in its ends, Fig. 8, engage notches 31 in the brackets *h*, Fig. 9, and notches 32 32 in the strip *i* engage notches 33 in the side pieces *g g*, Figs. 8 and 9.

Sixth. The perpendicular end sections or brackets, *j j*, Figs. 9 and 10, are then applied by passing their upper holes, 34, Fig. 9, over the projecting ends 35, Fig. 5, of the wing-pieces *b b*, and dropping them the thickness of the brackets *j* into the notches 36, Fig. 5. These brackets will then hang loosely from the notches 36 until the next piece is applied.

Seventh. The panel-section *c*, Fig. 5, is then applied by placing it in a vertical plane in front of its proper position and moving it bodily backward to its place. In so doing its notches 37 and 38, Fig. 5, engage the portions 39 and 40, respectively, Fig. 9, of the side pieces, *g g*, its notches 41 and 42 engage the portions 43 and 44, respectively, Fig. 9, of the end brackets, *j j*, and its notches 45 45 engage the portion 46, Fig. 9, of the brackets *h h*.

Eighth. The stiffening-rods G and G' are then applied by sliding them through endwise from one side of the structure. The rod G has grooves along its upper and lower sides, which, as it is thus slid in, engage, respectively, the lower edges of the sections *b*, *a*, and *b* above and the upper edge of the section *c* beneath. This rod G, in being thus slid into place, passes through the holes 34 in the end brackets, *j j*, Fig. 9, the holes 47 in the brackets *h h*, and the holes 48 in the side pieces, *g g*, which holes serve to retain the rod in its proper position and thereby enable it to impart rigidity to the sections of the back board which it engages.

Ninth. The stiffening-rod G' has a groove only in its upper side, which groove engages the lower edge of the section *c*, and the rod in being slid in endwise passes through holes 49 in the end brackets, *j j*, Fig. 9, and holes 50 in the side pieces, *g g*. These brackets or side pieces, and especially the pieces *g g*, serve to hold the two rods G and G' in proper relative position, thereby preventing the rod G' from either dropping away from the rod G or moving in forward or backward direction. Thus by the stiffness of the perpendicular sections or members of the structure the several sections constituting the back board are maintained in the same plane and are joined firmly together.

Tenth. The upper rod, F, is then applied, which is done by sliding it into place endwise from one side, in doing which it passes through holes 51, Fig. 9, in the side pieces, *g g*. This rod has a groove along its under side, which, as it is thus slid in, engages the upper edge of the middle section, *a*.

Eleventh. The knobs I I are then applied to the ends of the rods F, G, and G', being fastened thereto by gluing, nailing, or otherwise.

Twelfth. The parts constituting the towel-rack D D are then applied to the end brackets, *j j*, as already described.

Thirteenth. The ornamental pieces *d d*, Fig. 5, are then applied to the brackets or perpendicular sections *g g* and *j j*, notches 52 in the former, Fig. 5, engaging notches 53 53 in the latter, Fig. 9.

Fourteenth. The front door, C, and its cornice are then to be put together. Preferably the first step is to apply the rod K and its end buttons, L L, to the bottom edge of the board *q* of the door, as has already been described.

Fifteenth. The cornice H is then to be applied to the top of the door. The two brackets *v v*, Fig. 12, are first applied to the horizontal strip *t*, Fig. 11, the notches 54 in the former engaging with the notches 55 in the latter. These three parts are then applied to the board *q* by placing them above their proper position and moving them vertically downward, in which operation (see Fig. 15) the brackets enter notches 56 56, Fig. 14, in the top of the board $q$. The forward displacement of the brackets is prevented by hooks 57, Figs. 12 and 15, on the back of the brackets, which come against the rear side of the board $q$. Thus the brackets are held perpendicular to this board in vertical planes, and the strip $t$ is held perpendicular to it in a horizontal plane, with its rear edge lying against the board $q$.

Sixteenth. The two end brackets, $u\,u$, Fig. 13, are then applied by thrusting the tail 58 of each bracket through a hole, 59, Fig. 14, in the board $q$, in the manner shown in Fig. 16, and swinging the bracket rearward into place, as denoted by the arrow in this figure, so that its portion 60 enters a notch, 61, in the top of the board $q$, Fig. 14. The brackets $u\,u$ occupy perpendicular planes against the opposite ends of the strip $t$.

Seventeenth. The upper rod, J, may then be applied. As this rod constitutes the pintle of the hinge by which the door C is pivoted to the box B, it is necessary before applying this rod to place the door C in its proper position relatively to the box. The rod J is then slid in endwise from one side, so that it passes through holes 62, Fig. 13, in the brackets $u\,u$, through holes 63, Fig. 9, in the side pieces, $g\,g$, and through holes 64, Fig. 12, in the middle brackets, $v\,v$. This rod is grooved along its lower side, and in slipping it in its groove engages the upper edge of the board $q$, as shown in Fig. 14. The engagement of this groove holds the rod J and board $q$ firmly together and prevents their relative displacement in a forward or back direction. The separation of the rod from the board by pulling the latter downward from the rod is prevented by the brackets $u$, the shoulder 65 on which is in firm engagement with the upper margin of the slot 59, Fig. 16. The rod J is thus locked in place by the brackets $u\,u$, and itself acts to lock in place the brackets $v\,v$, which it prevents from moving upwardly.

Eighteenth. The end knobs, L L, are then applied to the rod J, by gluing or otherwise, whereby the endwise displacement of the rod is prevented.

Nineteenth. The rod N, Fig. 11, is then inserted by passing it in endwise from one side, in doing which it is passed through the holes 66, Fig. 13, in the brackets $u$, and the holes 67, Fig. 12, in the brackets $v$. This rod has a groove along its upper side. Knobs are applied to its ends, as shown.

Twentieth. The cornice-strip $s$ is then applied from the front by inserting its lower edge in the groove in the rod N and pressing its upper edge back against the brackets $v$ and $u$. This strip is formed with notches 67 67 at its bottom and 68 68 at its top, which, when it is thus put into place, engages the brackets $u$ and $v$. This strip $s$, which is of thin wood easily bent, is pressed back against the curved surface 69 of the brackets $u$ and $v$, Figs. 12 and 13, and is thereby bent to a concave. The lower portion of this strip $s$ is formed with tongues 70 70, which, when the strip is put in place, pass down through notches 71 71 in the strip $t$; or, in other words, the strip $s$ is formed with notches or openings 72 72, which admit projections 73 73 on the front of the strip $t$. (See Fig. 11.)

Twenty-first. The rod M is then applied by slipping it in endwise through the holes 74, Fig. 12, in the brackets $v$, and holes 75, Fig. 13, in the brackets $u$. In so doing the groove along the under side of this rod engages the upper edge of the strip $s$, and keeps the latter from being displaced forward. Knobs are then glued onto the ends of this rod.

Twenty-second. The mirror C' and its frame $p$ are applied to the door C in any suitable manner and at any convenient stage of the manufacture.

The construction of the cabinet is now complete.

The most important and distinctive features of my invention are the following:

First. The construction of a back board or other board or plate in two or more sections, either in the same plane or in different planes, and either straight or curved, as may be desired, the sections being united through the medium of stiffening members engaging their edges and holding the edges of the adjoining sections in proper relative position, and locking sections or brackets joined to the sections by being interlocked therewith and also fastened to the stiffening members. This stiffening member may be either a grooved rod or bar, such as the bar G, or it may be a section arranged in a perpendicular plane, such as the side pieces, $g\,g$, or both these expedients may be adopted in the same structure, both being, in a broad sense, interchangeable specific means of applying this feature of my invention, although, in a narrower sense and in view of their other functions as parts of the complete structure, they are not equivalents. In a broad sense the perpendicular sections $g$ connect together the edges of the sections $a$ and $b$ of the back in substantially similar manner to the connection of the sections $a$ and $c$ or $b$ and $c$, by the rod G. This feature of my invention has the important advantage that it enables the structure to be built up of smaller pieces or sections which can be cut to better advantage than if made entirely of one piece, and a pleasing and varied effect may be produced by combining sections of different kinds of wood, or those in which the grain of the wood runs in different directions. Further, in the employment of large sheets of thin material—such as three-ply veneer—it is necessary to stiffen them in some way, and my invention provides a simple, cheap, and durable means of accomplishing this purpose.

Figure 17:
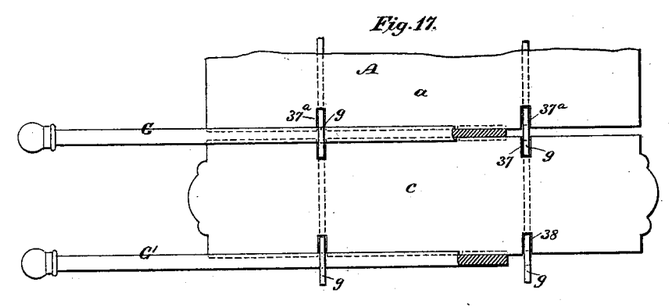
Figs. 17 and 18 are fragmentary views illustrating a simplified modification, the former being a front elevation and the latter a vertical section.
Figure 18:
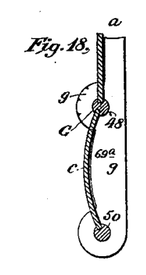

Second. The construction of a back board or other board or plate in two or more sections, the sections being united through the medium of grooved rods or analogous members engaging their adjoining edges and held in the desired relative positions to one another (either in the same plane or in different planes, and either straight or curved) by means of locking sections or brackets arranged in planes perpendicular to the sections of board and interlocked with the latter by means of projections on the one part entering recesses in the other, and also intersecting the axes of said rods and engaging the latter, so that in putting together the parts the said rods are slid in endwise and are confined in holes, notches, or other suitable sockets in the perpendicular members. As an illustration of a simple construction embodying this feature of my invention, I have introduced the modification shown in Figs. 17 and 18. In this construction the back board, A, consists of two sections, $a$ and $c$, with an intervening double-grooved rod, G, and a single-grooved rod, G', at the bottom. These rods are shown as only partly slipped in in Fig. 17. The sections $a$ and $c$ and the rods G and G' are held in the proper relative positions by the vertical perpendicular members $g\ g$, which have holes 48 and 50 for the reception of the respective rods, and which, where they project forward from the rear of the sections, lie in notches 37 and 38 in the section $c$ and in notches $37^a$ in the section $a$. This construction is one of the simplest possible in which this feature of my invention can be embodied, with the exception that the section $c$ is here shown as curved or swelled toward the front, which in some structures may be desirable. This section is held curved by being made wider than the distance between the two rods, and by the members $g\ g$ being formed with a swelled portion, $69^a$, which is analogous to the concave portion 69 in Figs. 12 and 13.

Third. The application of a stiffening-rod to the edge of a thin section or plate, the rod having a groove in its side engaging the edge of the section, and locking members or brackets being provided to engage said rod and interlocked with said plate or sections for preventing the movement of the rod away from the section. The upper and lower rods, F and G', of the back board, and the upper and lower rods, J and K, of the front door involve this feature of my invention. The means for preventing the displacement of the rod from the section consists either of the wings $r$, engaged by the knobs L, Fig. 14, or of perpendicular members or sections intersecting the rod, formed with holes or other equivalent recesses for engaging the rod and interlocked in some manner with the sections—such, for example, as the perpendicular side pieces, $g$, in their relation to the section $a$ and rod F at the top, or the section $c$ and rod G' at the bottom, or the brackets $u$ in their relation to the board $q$ and rod J. These different specific constructions embody this generic feature of my invention, being in a broad sense equivalent to one another, although in a narrower sense they perform other functions as parts of the entire structure, or in their relations with the other elements with which they are in engagement, and are consequently not equivalents.

Fourth. The construction of a box or case with a back section, two side sections perpendicular thereto, a horizontal top and bottom section interlocked therewith, and one or other or both of them extended beyond the side sections to form shelves, and lateral wing-pieces forming continuations of the back piece and held in position by being interlocked with the other elements. This is the construction involving the sections $a$, $b\ b$, $g\ g$, $e$, and $f$. They may be interlocked in different ways from those shown, if desired, provided the same essential result is attained—namely, of uniting them rigidly and firmly together by means of reciprocally-engaging notches or projections and slots, either or both. The sections $h\ h$ and $i$ are desirable but not essential to this construction.

Fifth. The combination, with a box or case, such as B, of a front door or cover, such as C, pivoted to the box by means of a rod, J, attached to the top or upper part of the door and passing through holes in the side pieces, $g\ g$, or other equivalent parts. Instead of the door being pivoted at its top it may be inverted and pivoted at its bottom; or it may be pivoted at either side, provided the same essential construction is employed as the means of pivoting it.

Sixth. The cornice H, applied either to the door C or to any other suitable part of the structure, and consisting of interlocked rods, strips, and brackets so combined as to reciprocally hold one another in position and bind the entire cornice firmly to the board or section to which it is applied. The construction of this cornice may be modified considerably without essentially changing it.

Figure 16:
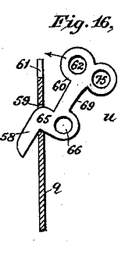

Seventh. In interlocked wooden structures, the feature of construction of which an example is shown in Fig. 16, and which consists in the interlocking of one part (as the bracket $u$, for instance) with another part perpendicular thereto (as the board $q$) by hooking a spur of the former into a hole or recess in the latter, and swinging the former into position by a rotary movement until it comes against and is stopped by the latter part, after which it is locked in position and prevented from being swung outwardly to disengage it by applying to it any interlocking part which engages (either directly or indirectly) the section (as $q$) to which it is applied. This interlocking part in the specific construction shown is the rod J, which engages directly with the section $q$.

My invention further consists in the several specific details of construction employed in the structure thus far described, which features are applicable independently of one another and which may be utilized in greater or less number in the construction of different articles or structures according to the system of my invention.

Two subsidiary features of my invention remain to be described.

Within the box B, I have shown in Fig. 3 an arrangement of oblique pigeon-holes or compartments which may be employed or omitted, as desired. These inclined pigeon-holes are well suited for the reception of bottles to hold medicines, &c.; or they may be modified in any way desired to adapt them for different uses. They are constructed of a series of vertical sections or brackets, $w$, and of a series of horizontal sections or shelves, $x\ x$, which are interlocked by means of notches 76 76, cut obliquely in the front portions of the brackets $w$, (one of which is shown separately to the right of Fig. 3,) and similar notches cut into the shelves $x\ x$ from their rear sides. One, two, or more of the shelves $x\ x$ are provided with projections 77, Fig. 2, at their opposite ends, which enter oblique slots 78, Fig. 9, in the side pieces, $g\ g$, whereby the pigeon-holes are maintained in position in the box B. When the door C is closed, it is retained in place by means of a sort of catch consisting of projections 79 and 80 on the side pieces, $g\ g$, Fig. 9. The projections 79 enter holes or slots 81, Fig. 14, in the door, and the projections 80 take under the bar K. (See Fig. 3.) The parts are so closely fitted that when the bottom of the door is pressed fully back the engagement of the projections 79 and 80 with it shall be accompanied by sufficient friction to securely fasten the door in place. The upper surface of the projections 80 should be very slightly curved or hooked in order that it may sufficiently embrace the lower side of the rod K to hold it in place and require the exercise of some little force to separate them. The elasticity of the respective parts permits them to yield sufficiently to engage and disengage this catch.

Figure 19:
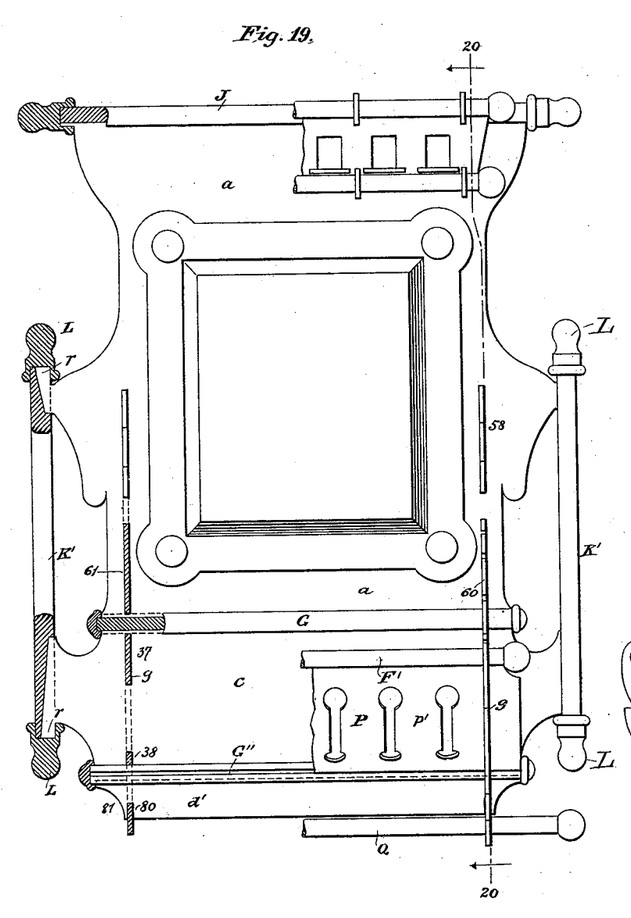
Figs. 19 and 20 illustrate a modification, the former view being a front elevation partly in section and the latter a vertical section cut on the line 20 20 in the former figure.
Figure 20:
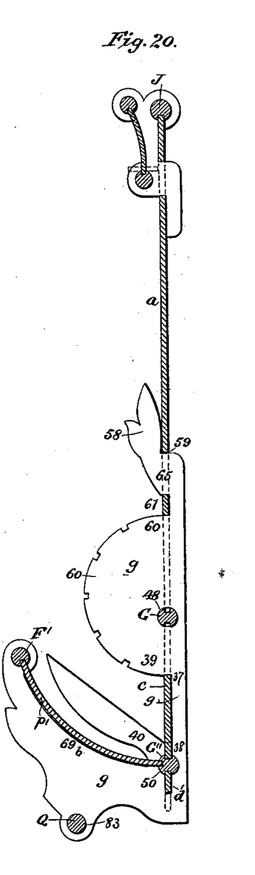

I will now proceed to describe the modification illustrated in Figs. 19 and 20. In this construction the box B is entirely omitted, the mirror C' is applied directly to the back board, the cornice H is also formed on the back board, and a basket or box, P, is formed at the lower portion of the structure.

The back board, A, consists of an upper section, $a$, a middle section, $c$, and a lower section, $d'$. Between the upper and middle sections is a rod, G, and between the middle and lower sections is a rod, G''. The vertical members by which these parts are tied together consist of perpendicular brackets or sections $g\ g$, one at each side. These brackets $g$ extend behind the sections for a sufficient distance to attain the requisite rigidity, and project forward around the rods G and G'', being provided with holes 48 and 50 for the reception of these rods respectively. The upper end of each bracket is formed with a tail or spur 58, Fig. 20, which enters a slot, 59, in the section $a$, the bracket being applied by inserting this spur in the slot and then turning the bracket toward the section $a$, (in the same manner as already described with reference to Fig. 16,) thereby bringing the shoulder 65 on the bracket against the lower margin of the slot, so that when the bracket is in place this shoulder prevents its displacement downwardly. The projecting portion 60 of the bracket enters a notch, 61, in the bottom of the section $a$. When both brackets are thus in place, the rod G may be slid through, after which the section $c$ may be put in place and its upper edge thrust into the lower groove in the rod. This section has notches 37 above and 38 below, which receive the projecting portions 39 and 40, respectively, of the brackets. The section $d'$ is then applied, its notches 80 being engaged with notches 81 in the brackets, after which the parts are locked firmly together by the insertion of the rod G'', which is slipped in endwise, with its upper and lower grooves engaging the edges of the sections $c$ and $d'$. The basket P is formed by a curved section, $p'$, the lower and rear edge of which is inserted in a groove on the front side of the rod G'', and the upper edge of which is held in the groove of a rod, F', which is slid in endwise through holes 82 in the brackets $g$. The curved surface of the section $p'$ rests against the curved edge $69^b$ of the brackets $g$, whereby the section is held to the proper curve. Another rod, Q, is applied beneath the basket P by thrusting it through holes 83 in the brackets. This rod constitutes a towel-rack.

The cornice H at the top is constructed in precisely the same manner as the cornice already described with reference to Figs. 11 to 16, the rod J being applied to the top of the section $a$, which latter takes the place in this construction of the board $q$ in those figures.

On each side of the back board is fastened a vertical rod, K', the upper end of which is attached to a projecting portion of the section $a$, and the lower end of which is applied to a projecting portion of the section $c$. These projecting portions enter grooves in the rod, and are formed with wings $r$, which are engaged by the knobs L L, applied to the ends of the rods, the construction in this respect being precisely the same as that illustrated with respect to the rod K in Fig. 14.

Numerous other modifications of my invention might be illustrated; but I deem those here presented sufficient to serve as examples of some of the changes which may be made without departing from the essential or from all the essential features of my invention.

It is not necessary to rely wholly upon the interlocking of the sections or parts; but in addition they may be fastened with glue, nails, screws, or otherwise.

In another application for patent for "music stands and other wooden structures," filed January 10, 1888, Serial No. 260,352, I have shown some features covered by the claims of my present application. I make no claim in this application to anything claimed in that one.

I claim as my invention the several improvements in interlocked wooden structures or interlocked structures of other analogous materials, defined as follows, substantially as hereinbefore specified, namely:

1. In an interlocked structure, the combination, with a board or plate, of a stiffening member extending along the edge thereof and constructed with a recess into which said edge projects, and one or more locking sections or brackets arranged perpendicular to said board, engaging and holding said stiffening member, and interlocked with said board by means of projections on the one part entering recesses in the other, whereby the stiffening member is held by said bracket against the edge of said board.

2. In an interlocked structure, the combination, with a board or plate, of a stiffening member extending along the edge thereof and constructed with a recess into which said edge projects, and one or more locking sections or brackets arranged perpendicular to said board between the ends thereof, whereby the board is not subdivided, formed with projections interlocked with recesses in said board and engaging and holding said stiffening member.

3. In an interlocked structure, the combination, with a board or plate formed with notches in one edge, of a stiffening member extending along the said edge and constructed with a recess into which said edge projects, and locking sections or brackets arranged perpendicular to said board, entering said notches in the edge thereof, engaging and holding said stiffening member, and interlocked with said board by being formed with projections entering recesses therein, whereby the stiffening member is held by said brackets against the edge of said board, and the lateral displacement of the brackets is prevented by said notches.

4. In an interlocked structure, the combination, with a board or plate, of a bracket arranged perpendicular thereto, formed with a socket in line with and extending beyond the edge of the board and interlocked therewith by means of a hooked projection on the one part entering a recess in the other, and a rod inserted through said socket and constructed with a groove engaging the edge of the board, whereby the insertion of said rod prevents the disengagement of said hooked projection, and the bracket prevents the movement of the rod away from the board.

5. In an interlocked structure, the combination, with a board or plate, of a bracket arranged perpendicular thereto, applied to one side thereof and extending beyond the edge thereof, and to and beyond the plane of the opposite side thereof, and formed in such projecting portion with a socket intersected by the edge of the board and extending beyond said edge, and said bracket interlocked with the board by means of a hooked projection entering a recess in the board, and a rod inserted through said socket and constructed with a groove engaging the edge of the board.

6. In an interlocked structure, the combination, with two or more sections of board arranged with their edges adjacent, of a stiffening member extending along their adjacent edges and constructed with recesses into which those edges project, whereby they are held in proper relative position, and locking sections or brackets arranged in planes perpendicular to said board and stiffening member, intersecting and engaging the stiffening member, and interlocked with said sections or board by means of projections on the one part entering recesses in the other, whereby said sections are held in engagement with said stiffening member and in invariable relative planes through the medium of said brackets.

7. In an interlocked structure, the combination, with two or more sections of board arranged with their edges adjacent, of a stiffening member extending along their adjacent edges and constructed with recesses into which those edges project, whereby they are held in proper relative position, and locking sections or brackets arranged in planes perpendicular to said board and between the ends thereof, intersecting and engaging the stiffening member and interlocked with the sections of said board, whereby the stiffening member and board are united without subdividing the board between its ends.

8. In an interlocked structure, the combination of a board constructed in two or more sections arranged with their edges adjacent to one another and formed with notches in said adjacent edges, a rod interposed between said edges and constructed with grooves embracing the latter, and a perpendicular section or bracket entering said notches, formed with a hole or recess engaging said rod and interlocked with said sections, whereby it holds the latter with their edges confined in the grooves in said rod.

9. In an interlocked structure, the combination of two or more sections or boards arranged with adjacent edges, one or more locking sections or brackets arranged each in a perpendicular plane and crossing said adjacent edges and interlocked with each of said sections by means of a projection on the one part engaging a recess in the other, and said bracket formed with a socket, into which both said adjacent edges project, and a grooved rod adapted to be inserted endwise through said socket to receive said adjacent edges in its grooves, whereby the insertion of said rod after the respective sections are in place serves to lock the parts firmly together.

10. In an interlocked structure, the combination, with a board or plate, of a rod applied to the edge thereof, and formed with a groove engaging said edge, a wing formed on the edge of the board and extending within said groove toward the end of the rod, and a knob or cap fitting over the end of the rod and inclosing said wing, whereby the rod is united to said board.

11. In an interlocked structure, the combination of two parallel rods or stiffening members having grooves on the sides toward each other, a board or section confined between said rods with its opposite edges held in said grooves, and sections arranged perpendicularly to said board between the ends thereof, intersecting and engaging said rods and extending from one rod to the other on one side of said board, whereby the rods are held at a fixed distance apart, and thereby retained in engagement with said board without subdividing the board transversely to said rods.

12. In an interlocked structure, the combination of a board constructed in two or more sections, two parallel stiffening-rods having grooves engaging the opposite edges of one of said sections between them, and a section or bracket applied to one side of the other of said sections, interlocked therewith by means of undercut projections entering recesses therein, arranged in a plane perpendicular to the direction of said rods and formed with holes or sockets engaging the latter, whereby the rods and their interposed section are held rigidly in position relatively to the section with which said brackets are interlocked.

13. In an interlocked structure, the combination of a board consisting of sections $a$ and $b$, united edge to edge, and a section or bracket, $g$, arranged in a plane perpendicular thereto and extending along and projecting between the adjoining edges of said sections, and corresponding projections and recesses on and in said sections and bracket, respectively, at their points of junction, and a locking member extending across the plane of said bracket in a plane perpendicular thereto and to said sections and interlocked with all three parts, whereby they are held in proper relative positions.

14. In an interlocked structure, the combination of a board consisting of middle section, $a$, and wing-sections $b$ $b$, with vertical brackets arranged at their intersection in planes perpendicular therewith and projecting between and interlocked with said sections, and one or more horizontal sections or shelves intersecting said vertical brackets and interlocked therewith and with said sections $a$ and $b$.

15. In an interlocked structure, the combination of a back board, A, a box, B, formed thereon and consisting of vertical side pieces or brackets, $g$ $g$, a horizontal top piece, $e$, and a horizontal bottom piece, $f$, one of said horizontal pieces extended laterally beyond the box to form shelves and interlocked with the back board.

16. The combination of a back board, A, vertical side pieces, $g$ $g$, a horizontal top piece, $e$, a horizontal bottom piece, $f$, extended laterally beyond the side pieces, and brackets $h$ $h$, engaging the opposite ends of the bottom piece, $f$, the several parts being interlocked with one another.

17. The combination of back board, A, vertical side pieces, $g$ $g$, a horizontal bottom piece or shelf, $f$, intersecting said side pieces and extending laterally beyond them, brackets $h$ $h$ at the ends of said shelf, and a front piece, $i$, arranged against the front side of said shelf, the several parts being interlocked with one another.

18. The combination, with a back board constructed with upper and lower sections, $b$ and $c$, the section $b$ constructed with lateral projections 35 and notch 36, and the section $c$ constructed with notches 41 and 42, of a perpendicular bracket-piece, $j$, engaging said notches, and grooved rods G and G', thrust through openings in said bracket-piece and thereby locking the parts together.

19. The combination of grooved rods G and G', section $c$, confined between them, bracket-piece $j$, intersected by said rods and interlocked with said section, and the swinging arm D of the towel-rack pivoted to said bracket-piece.

20. The combination, with an interlocked structure, of a bracket-piece, $j$, a pintle, $k$, and notched heads $m$ $m$ thereon, with their notches embracing projections on said bracket-piece, and the swinging arm D of a towel-rack pivoted on said pintle.

21. In an interlocked structure, the combination, with a box, B, of a door or cover, C, and a rod attached to one of the respective parts and passing freely through and capable of turning in eyes or holes formed in one of the sections constituting the other part.

22. In an interlocked structure, the combination, with a box, B, consisting of a back piece, top and bottom pieces, and two perpendicular side pieces, the latter extended beyond the top piece and formed with holes, a rod or pintle, J, passing through said holes, and a door or cover, C, attached to said rod.

23. In an interlocked structure, the combination, with a box, B, consisting of a back piece, top and bottom pieces, and perpendicular side pieces extending beyond the top piece and formed with holes, a rod or pintle, J, passing through said holes, a door or cover, C, with its edge entering a groove in said rod, and perpendicular brackets interlocked with said cover and having holes embracing said rod.

24. The combination, with a board, of a cornice, H, consisting of grooved rods, an interposed cornice-strip with its edges entering the grooves in said rods, and brackets arranged in vertical planes and interlocked with the board and said rods.

25. The combination, with a board, of a cornice, H, consisting of grooved rods M and N, the cornice-strip $s$, confined between them, and perpendicular brackets having holes through which said rods pass and interlock with said board.

26. The combination, with a board, of a cornice, H, consisting of a grooved rod, J, engaging the upper edge of the board, grooved rods M and N, a strip, $s$, confined between said rods, and perpendicular brackets having holes through which said rods J, M, and N pass and interlocked with said board.

27. The combination, with a board, of a cornice, H, consisting of grooved rods M and N, perpendicular brackets having holes through which said rods pass and interlocked with said board, a strip, t, interlocked with said brackets, and a strip, s, interlocked with said strip t and having its opposite edges confined in the grooves in said rod.

28. The combination, with a board, of a cornice, H, consisting of perpendicular brackets v v, interlocked with said board and applied from above, brackets u u, applied to the front of said board and so interlocked therewith as to resist upward displacement, and transverse members inserted horizontally through holes in said brackets, thereby tying the structure together.

29. In an interlocked structure, the combination of two grooved rods, perpendicular brackets having sockets for holding said rods, and formed between said rods with a curved edge, and a curved board or section resting against said curved edges of the brackets and having its opposite edges confined in the grooves in said rods.

30. In an interlocked structure, the combination of a curved strip or section, s, rods M and N, having grooves engaging the opposite edges of said section, and perpendicular brackets having sockets for holding said rods, and curved edges 69, adapted to support said curved section.

31. In an interlocked structure, the combination, with a board formed with a slot or opening therein, of a section perpendicular thereto, formed with a spur adapted to enter said opening, and with a shoulder at the base of said spur, and adapted to be connected to said board by inserting its spur in said opening and swinging it into position against the board by a rotary movement, thereby bringing said shoulder against the end of the opening, and a third part constructed to be subsequently applied and fastened to said board, so that it cannot be displaced outwardly, and engaging said perpendicular section to prevent the swinging of said section outwardly from the board.

32. In an interlocked structure, the combination, with a board formed with a slot or opening, of a section or bracket formed with a spur, 58, and shoulder 65, and adapted to be engaged with said board by inserting its spur in said opening and swinging it against the board by a rotary movement, and a rod engaging the said board and inserted laterally through a hole or socket in said bracket, whereby the disengagement of the latter is prevented.

33. In an interlocked structure, the combination, with a board formed with a slot or opening, 59, and a notch, 61, of a perpendicular section or bracket formed with a spur, 58, and shoulder 65, adapted to be inserted in said opening, and with a projection, 60, which, on the swinging of the bracket against the board by a rotary movement, enters said notch 61, and a locking piece or part adapted to be applied after the bracket is thus brought to position and engaging both the board and bracket.

In witness whereof I have hereunto signed my name in the presence of two subscribing witnesses.

HUDSON BOGARDUS.

Witnesses:
  WM. H. HANNAM,
  GEORGE H. FRASER.